J. W. SPRINT.
COMMODE.
APPLICATION FILED APR. 12, 1912.
1,061,879.
Patented May 13, 1913.
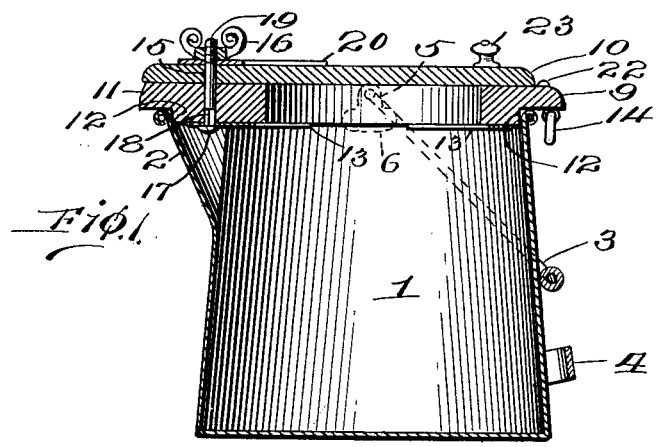
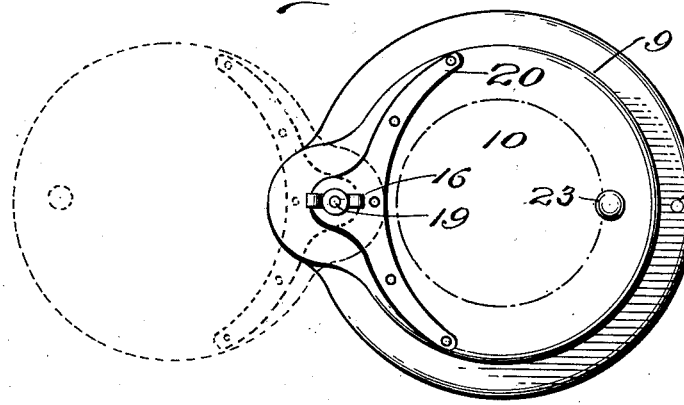
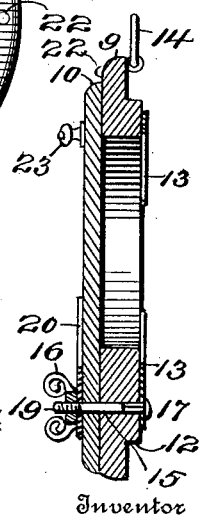
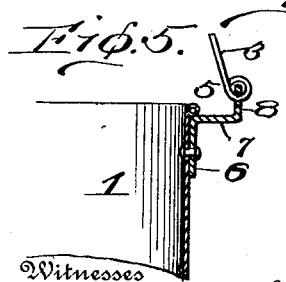
Witnesses
J. M. Fowler Jr.
N. L. Warm
Inventor
John W. Sprint,
By Mason Fenwick Lawrence
Attorneys

UNITED STATES PATENT OFFICE.

JOHN W. SPRINT, OF BOYCE, VIRGINIA, ASSIGNOR OF ONE-HALF TO GEORGE W. GARVIN, OF BOYCE, VIRGINIA.

COMMODE.

1,061,879.  Specification of Letters Patent.  Patented May 13, 1913.

Application filed April 12, 1912. Serial No. 690,347.

*To all whom it may concern:*

Be it known that I, JOHN W. SPRINT, a citizen of the United States, residing at Boyce, in the county of Clarke and State of Virginia, have invented certain new and useful Improvements in Commodes; and I do hereby declare the following to be a full, clear, and exact description of the invention, such as will enable others skilled in the art to which it appertains to make and use the same.

My invention relates to improvements in portable household commodes and consists of certain novel constructions and combinations of parts, as will be hereinafter described.

The object of my invention is the production of a portable commode having a cover which serves as a seat, and which is bodily removable from the vessel or container proper and which is held in position on the body of the container without the necessity of any fastening means being employed, and which, when in position, practically seals the vessel airtight against the escape of odors, but which, when desired, can be immediately removed from the vessel without the manipulation of any fastening means.

Another object of my invention is the production of a portable household commode which is provided with a pivoted horizontally-sliding cover which can be locked in position on the seat of the commode to prevent the escape of odors or gases, and which can be readily turned out of the way when the commode is to be used by simple manipulation of a fastening bolt, the mechanism of the fastening bolt being entirely out of the circumferential area of the main body portion or container.

In the accompanying drawings, Figure 1 is a vertical section of my improved portable household commode. Fig. 2 is a top plan view with the lid loosened and turned or swung to one side. Fig. 3 is an inverted plan view of the seat and lid. Fig. 4 is a section through the cover and seat in a locked condition. Fig. 5 is a vertical section through a portion of the vessel and showing the construction of the ear and bail.

1 in the drawings represents the vessel or container, which may be made in various sizes to suit the convenience of the user and is provided with a large pouring mouth, 2, a suitable pivoted handle 3, preferably with a rigid handhold 4, the latter located on the side of the vessel near the bottom thereof. The vessel or container 1 is preferably provided with ears 5, located near the upper edge thereof and projecting therefrom at a suitable distance to accommodate the seat and cover and allow for the swinging of the bail or handle 3 and carry the commode without impinging against said seat and cover. These ears 5 are preferably formed of a piece of thin material and comprising an attaching flange 6, an outwardly extending portion 7, and an upwardly extending portion 8, the latter being provided with apertures in which the bail is pivoted. The vessel or body portion 1 is preferably made slightly flaring from top to bottom, the greatest width being at the bottom so as to secure a greater supporting area at the base or bottom of the vessel. The vessel is preferably enameled or otherwise coated so that it can be conveniently cleaned and the metal will not be attacked by the contents thereof.

By the construction and arrangement just described, the commode can be conveniently transported from place to place as desired.

The closure for the vessel consists of a bodily removable seat portion 9 which carries the lid proper 10, which latter is pivoted to the seat portion, as shown.

The seat portion is provided with an extension 11 which conforms substantially to the shape of the mouth 2 of the vessel, and is designed to fit over the same. The seat portion is provided on its under side with a rabbet formation 12 which extends all around the seat portion, including the extension 11, so as to closely fit the upper edge of the vessel or body portion 1, to prevent the escape of any odors or gases therefrom. The apertured seat portion 9 is provided on its under side with reinforcing strips, preferably of metal, 13, 13, which extend across the grain of the wood to prevent the same from splitting. The seat portion is also provided with a suitable handle 14, located preferably at the front thereof and consisting of a hinged or pivoted handle which can be turned out of the way against the outside of the vessel 1 when not in use, but which can be readily turned so as to be grasped by the hand when it is desired to remove the seat portion therefrom for emptying the contents of the vessel. It is never intended to remove the seat portion from the body portion except in emptying the contents of the vessel, as it is always desirable to keep the seat portion snugly in position on the upper end of the body portion to prevent the escape of odors or gases therefrom.

It will be observed that I do not employ any auxiliary fastening means for keeping the seat on the body portion when it is desired to secure the seat on the body portion or when removing the same therefrom. By providing a rabbet formation on the under side of the seat, the seat rests securely on the upper end of the body portion and is not liable to fall off at the time when it is desired to remove the seat or empty the contents of the vessel by grasping the handle 14 and lifting the seat bodily from off the body portion, and after the contents have been thrown out and a supply of water placed in the vessel, the seat can be readily returned to its original secure position on said vessel.

As heretofore stated, the seat 9 carries a pivoted lid adapted to swing in a horizontal plane. This lid is secured to the seat by means of a bolt 15 and a winged nut 16, as shown. The bolt 15 is provided with a head 17, a square shank portion 18 and a threaded portion 19. The bolt 15 is made of sufficient length to extend entirely through the seat portion 9 and the lid or cover 10 and project a sufficient distance above the lid to permit the winged or flanged nut 16 to be applied to the threaded portion 19 of the bolt and be screwed down so as to draw the seat 9 and lid 10 closely together and thereby clamp the lid or cover to the seat to guard against accidental movement. The head 17 of the bolt bears against one of the metal strips 13, and the end of the winged or flanged nut 16 bears against a metal strip 20 attached to the lid, which strip serves as a bearing for the winged nut and also prevents the wood from splitting, and serves as an ornamental finish for the commode. The squared portion 18 of the bolt 15 fits a corresponding square portion in the seat and prevents the bolt from turning when the lid is clamped to the seat. If this squared portion on the bolt were not provided, the lid could be turned, even though it were clamped more or less tightly against the seat, as the whole bolt would turn, whereas with the squared bolt construction the bolt cannot turn, and after the seat has been clamped down, it is practically impossible to turn the same. By pivoting the seat in the manner shown and described, the same can be turned either to the right or left, which is very desirable, as it is not only facilitates the manipulation of the lid, but also permits the same to be used without alteration in the right or left hand corner of a room or in a crowded condition in a room, where, if it is not convenient to turn the lid to the right, it can be turned to the left. A more important feature of the sliding cover or lid in combination with the clamping bolt and nut is that the lid can be tightly clamped to the seat so that the escape of gases or odors from the vessel is practically impossible. Another important feature of my invention is the arrangement and location of the clamping bolt and nut directly over the pouring mouth of the vessel, which is outside of the circumferential line of the main body portion. The advantage of this construction is that if the seat were not provided with the extension 11 and located and arranged directly in line with the mouth 2, the bolt would be thrown so close to the edge of the aperture in the seat that it would not only come in contact with the back of the user of the commode, which would be very disagreeable, but there would not be enough bearing surface for the lid. By employing the extension 11 on the seat and by providing the lid with a similar extension, the bolt is thrown back sufficiently from the aperture of the seat so as not to interfere with the use of the commode, and a large bearing surface is also secured for the lid and said seat.

In order to facilitate the exact centering of the lid over the aperture in the seat, I provide a button or indicator 22, which is centered in alinement with the bolt 15, which bolt and indicator button 22 are so located that when a knob 23 on the lid is in alinement with said bolt and indicator button the aperture in the seat will be completely closed by the lid. The handle 14, connected to seat 9, as heretofore explained, enables the seat and cover to be readily lifted off the vessel 1 and also avoids the necessity of the hand coming in contact with the under side of the cover and greatly facilitates the handling of said seat and cover as one structure, for when the lid is clamped in position on the seat, the lid cannot swing or move out of position, but can be carried about with the seat as one united part.

Having now described my invention, what I desire to secure by Letters Patent is:

1. In a commode having an opening of irregular shape, a body portion adapted to fit into the opening, said body being provided with an opening, a bolt held rigidly in place in the body, and a cover for the opening of the body pivoted to the bolt, said cover being adapted to swing in one plane and remain in close contact with the body part.

2. In a commode having an opening provided with a recessed part, a seat having a projection adapted to fit into the recessed part of the opening, a bolt secured in the projection, a cover pivoted to the bolt and adapted to swing in a plane coextensive with the plane of the cover when the latter is at rest, and means for swinging the cover.

In testimony whereof I affix my signature in presence of two witnesses.

JOHN W. SPRINT.

Witnesses:
GEORGE H. MACDONALD,
NANNIE MEEM.

Copies of this patent may be obtained for five cents each, by addressing the "Commissioner of Patents, Washington, D. C."